No. 723,953. PATENTED MAR. 31, 1903.
H. W. WALDMIRE.
GLAZING SYSTEM.
APPLICATION FILED APR. 18, 1902.
NO MODEL.
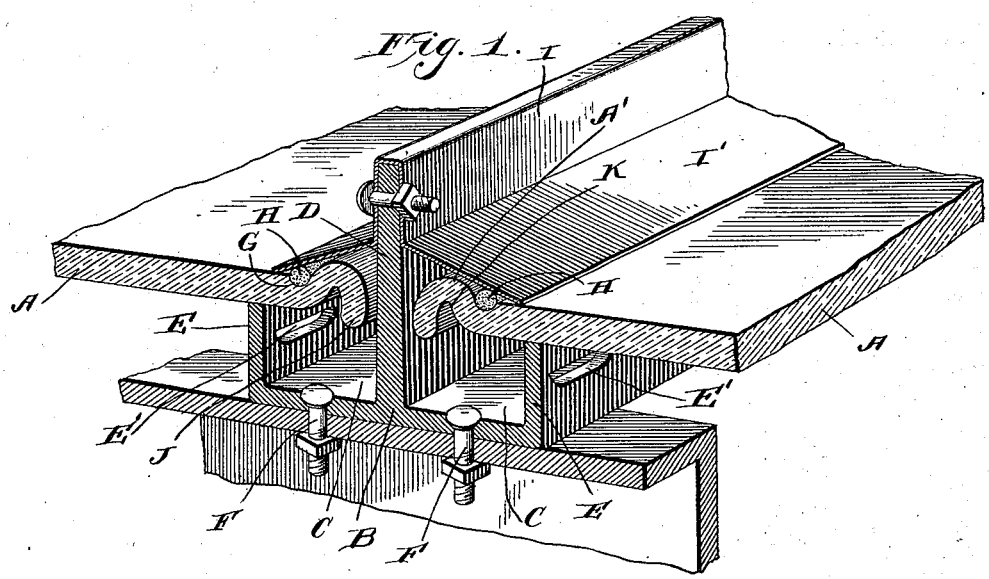
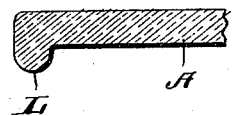 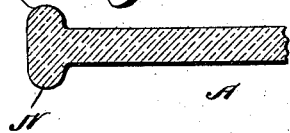
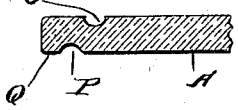
Witnesses
Louis D. Heinrichs
L. H. Morrison
Inventor
Henry W. Waldmire
By his Attorney
W. Preston Williamson

UNITED STATES PATENT OFFICE.

HENRY W. WALDMIRE, OF PHILADELPHIA, PENNSYLVANIA.

GLAZING SYSTEM.

SPECIFICATION forming part of Letters Patent No. 723,953, dated March 31, 1903.

Application filed April 18, 1902. Serial No. 103,541. (No model.)

*To all whom it may concern:*

Be it known that I, HENRY W. WALDMIRE, a citizen of the United States, residing at Philadelphia, county of Philadelphia, and State of Pennsylvania, have invented a certain new and useful Improvement in Glazing Systems, of which the following is a specification.

My invention relates to a new and useful improvement in glazing systems, and has for its object to provide a system of glazing, particularly to be used in connection with skylights, in which putty and similar cements are dispensed with, and has for its particular object to so construct the glass and other parts as to prevent the water from passing around the edge of the glass and flowing along the under side into the building.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—
Figure 1 represents a perspective sectional view of a joint between two panes of glass according to my invention; Fig. 2, a section of one end of a pane of glass, showing a modified form of construction; Fig. 3, a sectional view of one end of a pane of glass, showing another modified form of construction; Fig. 4, a sectional view of an end of a pane of glass, showing a still further modied form.

In the drawings, A represents the two panes of glass adapted to be joined together.

B represents the glazing-bar, which is formed with two channels C upon each side of the vertical rib or web D, which extends upward a considerable distance above the side flanges E. The panes of glass A are adapted to rest upon the top of the side flanges E and the edges of the panes of glass come in contact or within a short distance of the central web or rib D. The glazing-bar B may be secured to these supports in any suitable manner, here shown as by means of the bolts F.

There are several systems for glazing now patented, in which putty and similar substances are dispensed with, and for this purpose I construct the inner edges of the panes of glass upon the upper side with a groove G, in which packing H is inserted. A cap-piece I is then fitted over the upper edge of the central web or rib D, and this cap-piece has inclined flanges I', which come in contact with the packing and also the upper face of the panes of glass. In addition to the groove G the glass is formed into a ridge or hump which extends preferably above the plane of the glass and then bends downward to a point preferably below the plane of the lower surface of the panes of glass, so as to form the edge J, and thus a channel or groove K is formed in the lower side of the glass, and in this way it will be seen that any water beating in underneath the flanges I' and passing the packing H will first have to pass upward over the hump or ridge A', and then it flows downward to the edge J, where it will drop off into the channel C, as it would be an utter impossibility for the water to flow upward again around in the groove or channel K and be held to the glass by capillary attraction. Thus the edges J form drip edges, making it impossible for the water to pass such edges, and thus all moisture will drop off into the channel C and flow away in the usual manner.

While I have stated before that this forming of the glass is the principal feature of my invention, I do not wish to confine myself to this particular form shown in Fig. 1, as the principal point is that a dripping edge shall be formed upon the glass, which edge the moisture and water will be unable to pass, and therefore will of necessity be forced to drip from said edge.

While it is advantageous to have a hump and groove upon the upper surface of the glass, the glass could be manufactured the same as shown in Fig. 2, with only a ridge L upon the lower edge to form the dripping edge, or the glass could be formed as shown in Fig. 3, with the ridges M and N upon the upper and lower surfaces, the lower ridge N forming the dripping edge. In the form shown in Figs. 2 and 3 the grooves are dispensed with, or the glass could be grooved, as indicated at O and P in Fig. 4. Then the water would not be liable to pass around and across the under groove P and would then be compelled to drip from the edge Q.

For the purpose of preventing the moisture from collecting upon the glass and dripping into the building, which is formed by condensation, owing to the great difference in temperature of the interior of the building and the exterior, I provide through the side flanges E openings E', which will allow a certain amount of cold air to pass from the interior of the channel-bar to the interior of the building, and this cold air entering just below the skylight will thus tend to equalize the temperature and prevent this condensation.

Of course I do not wish to be limited to the exact construction here shown, as slight modifications could be made without departing from the spirit of my invention.

Having thus fully described my invention, what I claim as new and useful is—

1. In a glazing system, a glazing-bar formed with vertical side flanges and a vertically-central rib or web, the panes of glass adapted to rest upon the side flanges, the inner edges of said panes of glass provided upon the upper surface with a groove or channel, a dripping edge provided upon the lower surface, a groove or channel between this dripping edge and the body of the glass, packing inserted in the upper groove or channel, a cap fitting over the central rib or web, flanges extending outward from said cap and resting upon the packing and the upper surface of the glass, as and for the purpose specified.

2. In a glazing system, a glazing-bar formed with vertical side flanges having apertures at a certain predetermined distance which will permit air to pass from the interior of the channel-bar to the interior of the building, and a vertically-central rib or web rising above the side flanges, panes of glass adapted to rest upon the side flanges, depending lips formed on the inner edges of said panes, a cap fitting over and secured to the central rib, flanges extending outward from each side of said cap and coming in contact with the upper surface of the panes of glass upon each side substantially as described.

3. In a glazing system, a glazing-bar consisting of vertical side flanges and a vertically-central rib or web rising above the level of the upper edges of the side flanges, the panes of glass adapted to rest upon the upper edges of the side flanges, the inner edges of said panes formed with depending ledges or lips from which the moisture is adapted to drip into the channels of the glazing-bar, a cap fitting over and secured to the central rib or web, flanges extending outward from each side of said cap and coming in contact with the upper surface of the panes of glass, packing interposed between the flanges and the upper surface of the panes of glass, the side flanges of the glazing-bar provided with openings, substantially as described and for the purpose specified.

In testimony whereof I have hereunto affixed my signature in the presence of two subscribing witnesses.

HENRY W. WALDMIRE.

Witnesses:
H. B. HALLOCK,
L. W. MORRISON.